UNITED STATES PATENT OFFICE.

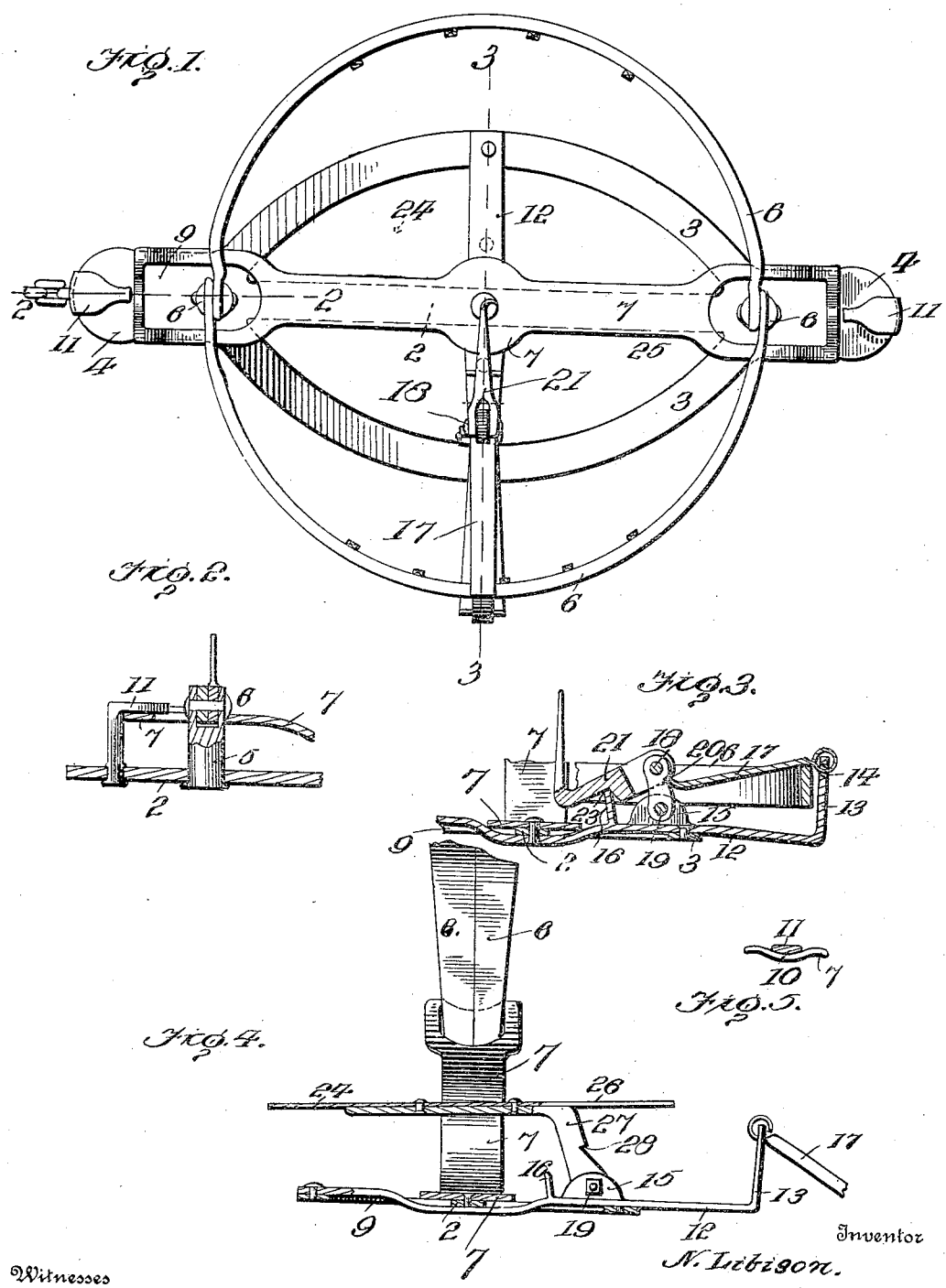

NICHOLAS LIBISON, OF HOMESTEAD, PENNSYLVANIA.

SPRING-TRAP.

946,608.  Specification of Letters Patent.  Patented Jan. 18, 1910.

Application filed April 27, 1909. Serial No. 492,562.

*To all whom it may concern:*

Be it known that I, NICHOLAS LIBISON, citizen of Austria-Hungary, residing at Homestead, in the county of Allegheny and State of Pennsylvania, have invented certain new and useful Improvements in Spring-Traps, of which the following is a specification.

My invention relates to animal traps, and particularly to traps of that character designed for the trapping of large animals, and including opposed jaws, a spring for forcing the jaws together, a latch holding the trap open, and a trigger operated by the animal for actuating the latch.

The invention consists in certain improvements in this class of traps, more particularly in the means whereby the jaws may be held open while the trigger is being baited or set, and in the provision for an interchangeable bait hook or foot plate, and in certain details of construction and arrangements of the parts set forth in the following specification and illustrated in the accompanying drawings, wherein:

Figure 1 is a plan view of my trap with the jaws open; Fig. 2 is a sectional detail on the line 2—2 of Fig. 1; Fig 3 is a sectional detail on the line 3—3 of Fig. 1, showing the bait trigger in place; Fig. 4 is a sectional detail also taken on the line 3—3 of Fig. 1, showing the foot plate substituted for the bait trigger; and Fig. 5 is a fragmentary detail showing the dished form of the spring terminals and one of the buttons for holding the spring in its tensioned position.

Corresponding and like parts are referred to in the following description and indicated in all the views of the drawings by the same reference characters.

As shown in the drawings, the base of the trap consists of the central longitudinal bar 2, and the semicircular bars 3, connected at their ends to the bar 2 and welded to the same to form the prolongations 4 at each end of the base. Riveted into the base at the opposed junctions of the bars 3 and 2, are the bifurcated posts 5. Semicircular jaws 6 of the usual character, are pivoted at their ends in said posts, these jaws being preferably provided with inwardly projecting teeth, as usual. The spring of my trap consists of a bowed strip of metal 7 riveted at its middle to the middle of the bar 2 and having at its ends the approximately rectangular openings 9. It will be seen from Fig. 5 that the extremities of the strips 7 are laterally curved or dished, as designated by the numeral 10, so that the center of the strip at the extremities is lower than the margins of the strip. This is in order to hold the buttons 11 from turning them in engagement with the extremities of the springs 7. The buttons 11 are preferably metal rods bent at one end at right angles to the shank of the same and there somewhat flattened and broadened. The shank extends down through the base and is loosely riveted thereto so as to permit the buttons to be turned into or out of alinement with the spring strips 7. The supporting bar for the latch and trigger consists of a metal strip 12 which is riveted at one extremity to one of the bars 3, preferably passes beneath the bar 2, then to the upper face of the opposed bar 3, is riveted thereto, and extends out slightly therefrom, and is then bent upward, as at 13, the upwardly bent extremity being slotted near its end, the slot being designated 14. The strip is provided with the opposed and upwardly extending ears 15 and with the upwardly extending lug 16. 17 designates a latch which at its outer end is formed into an eye which surrounds the bar formed by the slot 14. This latch is upwardly bent at its extremity.

I may use two forms of trigger, and have specially devised my trap to permit the substitution of one form for the other. In Fig. 3, the trigger is provided with a hook whereby bait may be attached to the trigger, whereas in Fig. 4, the trigger is operated by a foot plate.

Referring to the first form of the invention, 18 designates a link which is pivoted by a screw pivot 19 to the ears 15. The outer edge of this link is notched, as at 20, for engagement with the extremity of the latch 17. The extremity of the link is pivoted to the bifurcated shank of a hook 21 whose end body is upwardly turned and then laterally turned to form a hook to which bait may be attached. The lower edge of the hook shank is shouldered, as at 23, and this shoulder is slightly rounded and engages over the upwardly projecting stud 16 when the parts are in their set position. The operation of this form of trap will be obvious. The stud 16 will prevent to a large extent, the hook being pulled laterally, and the bait being thus stolen, and in order to better get the bait, the animal is forced to stand in the middle of the trap and between the jaws, and to draw upward upon the bait. It will be obvious that the drawing upward of the hook will release the latch 17 from the notch 20, and that the spring 7 will immediately force the jaws 6 together.

In Fig. 4 and in dotted lines in Fig. 1, I have shown a foot plate substituted for the bait trigger. This plate 24 is circular in plan and cut away on opposed sides, as at 25, to accommodate the spring 7. It is also cut away, as at 26, to accommodate the latch 17. To the under side of the plate is riveted a downwardly projecting ear 27 having a perforation for the passage of the pivot bolt 19, and the rear edge of this ear is notched, as at 28, to receive the end of the latch 17. The operation of this foot plate is practically the same as that heretofore described. The depression of the foot plate of course releases the latch, and the spring draws the jaws closed.

The advantages of my invention reside not only in the simplicity of the construction and rigidity of the parts, but in the buttons which hold the spring strips closed, and the dished form of the ends of the traps which prevent the buttons from moving sidewise when engaged with the spring, until the spring is depressed. Further, I provide a trap which, by very slight change of parts, may be made into a foot-actuated trap or bait-actuated trap, as desired, and thus adapted for various purposes, and in this connection I provide a bait-actuated trap which must be operated by an animal drawing upwardly upon the hook, and from which the bait cannot be stolen.

Having thus described the invention, what is claimed as new is:—

1. In an animal trap, a base, opposed posts, jaws pivoted to the posts, a spring riveted to the base and having openings at its ends through which the posts pass, a latch for holding the jaws open against the spring, and pivoted buttons at the ends of the base adapted to be turned, engaging with the springs to hold them in their depressed position while the trap is being set.

2. In an animal trap, a base, a bowed spring attached to the base and extending upwardly and outwardly therefrom, the ends of the spring being slotted, posts attached to the base and projecting upward through the slots of the spring, jaws pivoted to the posts, and buttons pivoted to the ends of the base and adapted to engage over the ends of the spring, said ends of the spring being laterally curved or dished to receive and hold said buttons in engagement.

3. In a trap of the kind described, a base, jaws pivoted to the base, a spring for closing the jaws against each other, ears projecting from the base, a latch attached to the base, having a free end, said latch engaging over the jaws, a bait hook having a depending link pivoted between said ears, said link being notched at one side, and an upwardly extending lug preventing the movement of the bait hook laterally.

4. In a trap of the class described, a base, opposed jaws for operating said base, a pivoted latch adapted to engage over one of said jaws to hold it closed, a link having a notch on one edge adapted to engage with the free end of the latch, a bait hook, the shank of which is pivoted to the link, the lower edge of which is formed with a downwardly extending shoulder, and a lug on the base extending upward and adapted to be engaged by said shoulder to prevent the link from being drawn laterally.

In testimony whereof I affix my signature in presence of two witnesses.

NICHOLAS LIBISON. [L. S.]

Witnesses:
HARRY E. BURCHFIELD,
JEAN LARAIRN.